March 2, 1971     J. L. CHRISTMANN     3,566,678
MASS MEASURING SYSTEM
Filed April 24, 1968     4 Sheets-Sheet 2
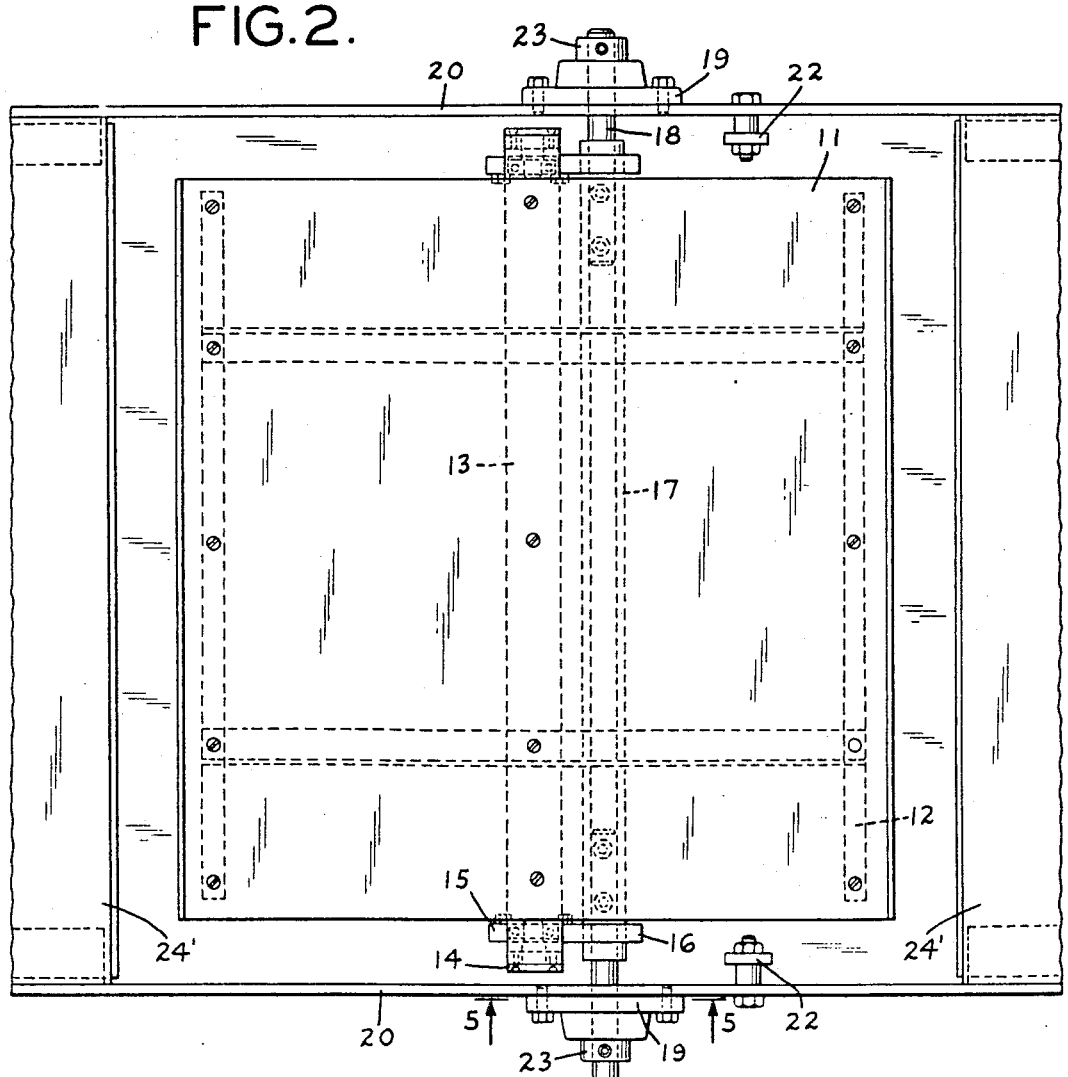
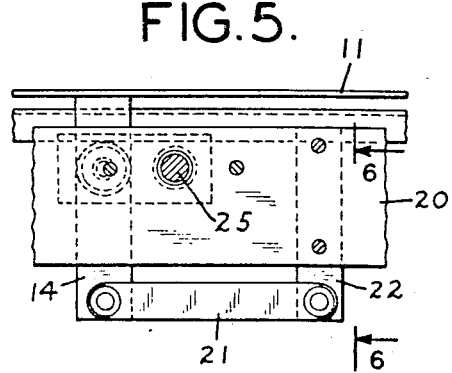
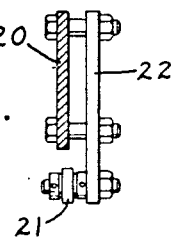
INVENTOR
JOHN L. CHRISTMANN
BY
*John A. Seifert*
ATTORNEY

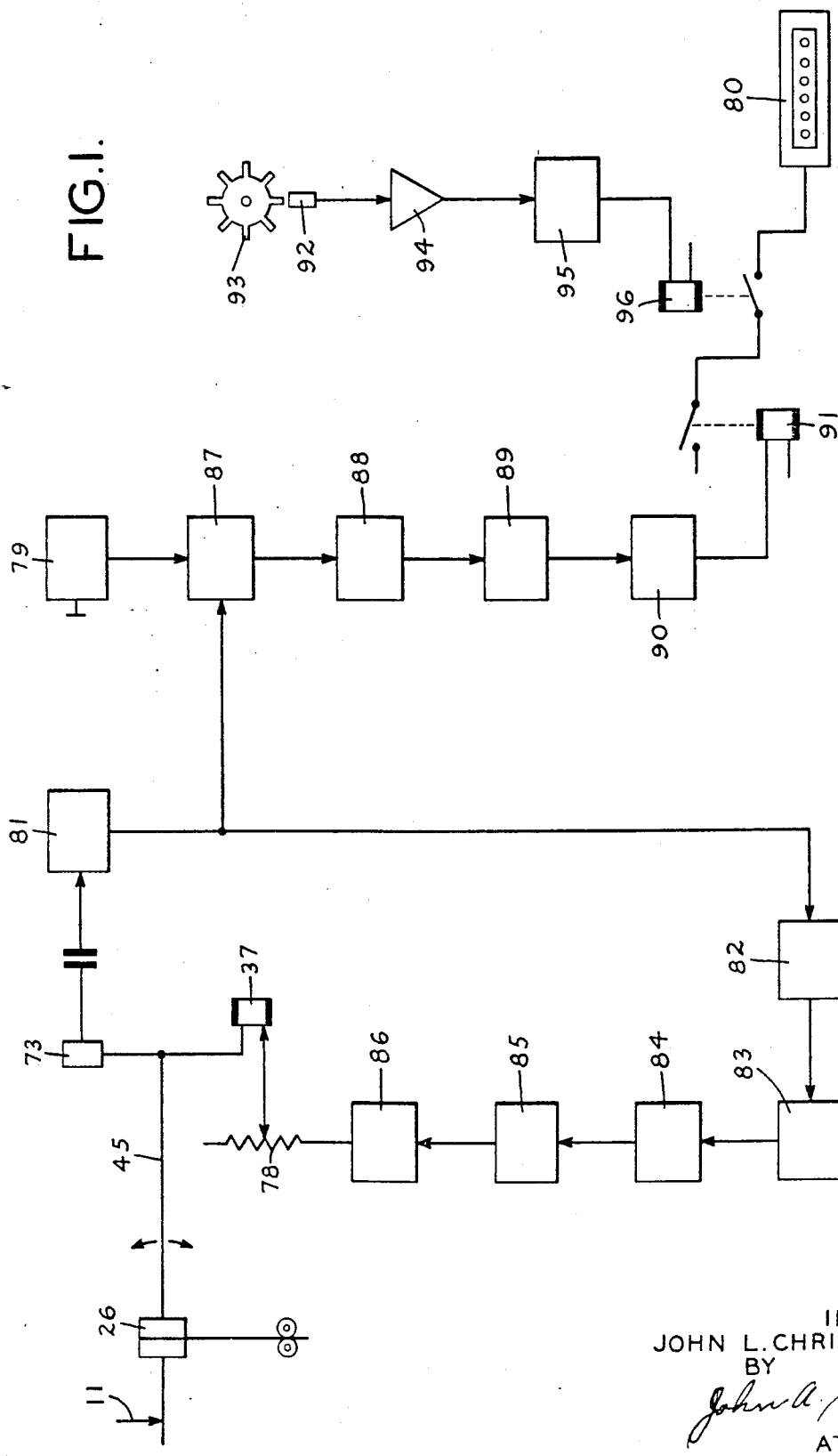

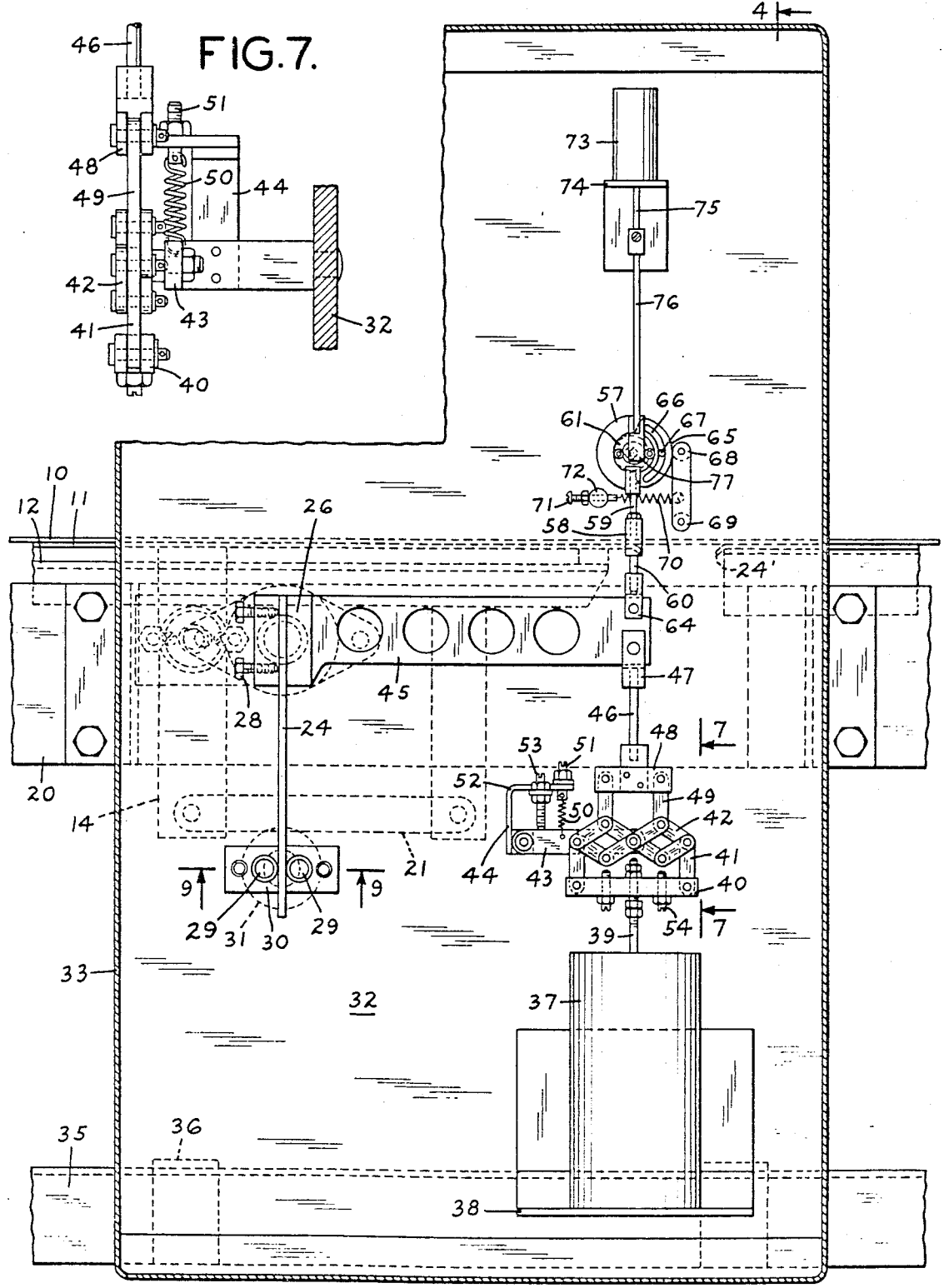

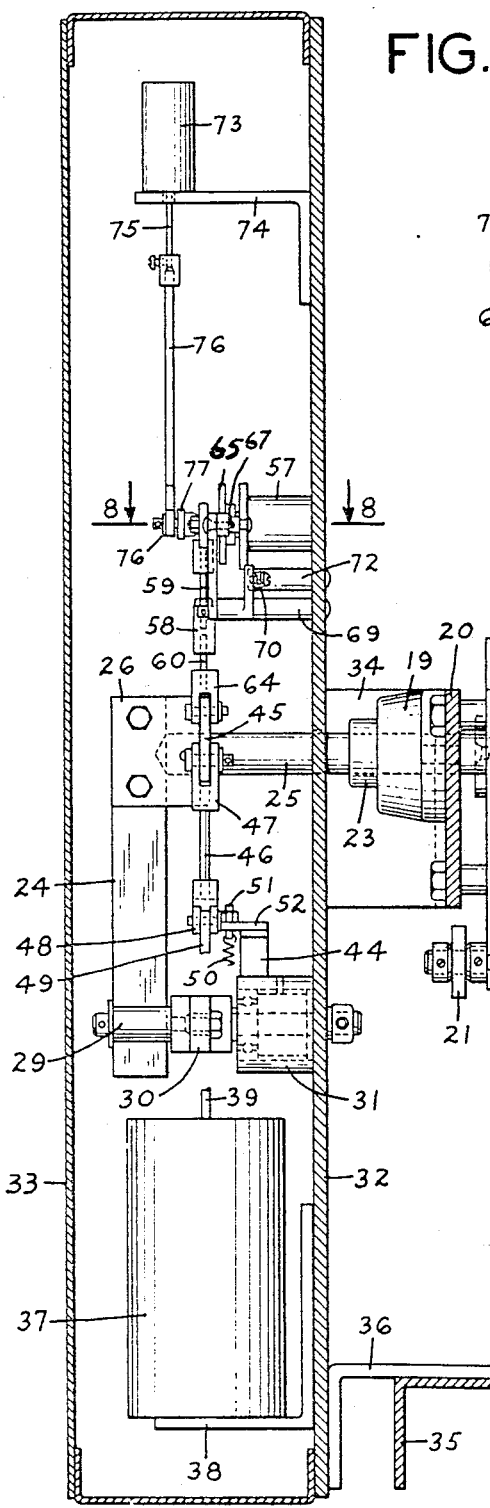
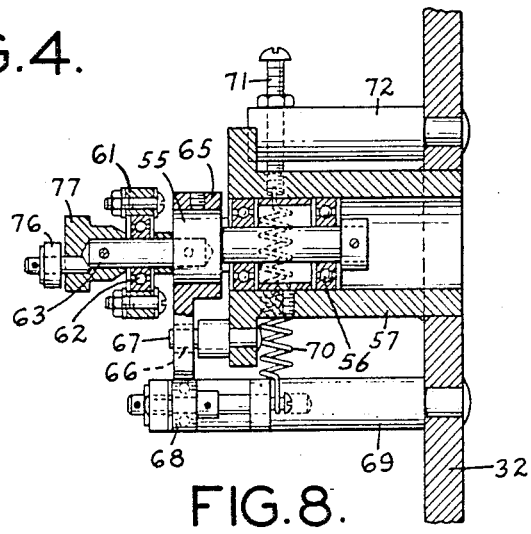
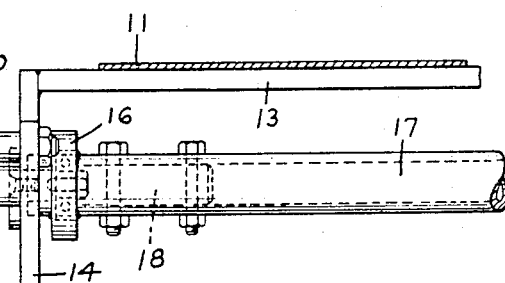
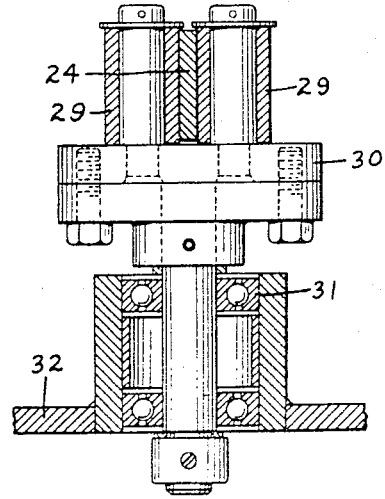

United States Patent Office 3,566,678
Patented Mar. 2, 1971

3,566,678
MASS MEASURING SYSTEM
John L. Christmann, Passaic, N.J., assignor to Merrick
Scale Mfg. Company, Passaic, N.J.
Filed Apr. 24, 1968, Ser. No. 723,834
Int. Cl. G01n 29/00
U.S. Cl. 73—67.2                                8 Claims

ABSTRACT OF THE DISCLOSURE

The present invention comprises an elastic member deflected and oscillated by a load, electromagnetic means to excite and sustain the oscillation of the elastic member, a transformer actuated by the oscillation of the elastic member and electrically connected to the electromagnetic means, and means electrically connected to the electromagnetic means and the transformer to count the oscillations and including a differential pulse system.

My Pat. No. 3,354,698 issued Nov. 28, 1967 and assigned to Merrick Scale Mfg. Company disclose mechanical means for the excitation of the mass measuring system.

The present invention employs electromagnetic means for the excitation of the mass measuring system comprising a load platform pivotally supported, an elastic member secured at one end to the pivot support of the load platform to be deflected and oscillated by the load on the platform, and the opposite end of the elastic member being guided between two rollers pivotally mounted as a unit. Said electromagnetic means is connected to the pivot support of the load platform to excite and sustain the oscillation, and said connection between the electromagnetic means and the pivot support being arranged to prevent the transmission of the deflection and oscillation of the load platform to the electromagnetic means. The frequency of the oscillations is not linear with load changes and this is corrected by an eccentric connected to the pivot support of the load platform and provided with a cam contacted by a spring loaded follower. The energization of the electromagnetic means is controlled by a differential transformer connected to and operated by the eccentric to sustain oscillation of the load platform. Said transformer is also connected in circuit with a differential pulse system having a frequency equal to the frequency of oscillations at balance of the load platform. The output of the differential pulse system drives a counter.

In the drawings:

FIG. 1 is a schematic view of the electrical circuit of the invention;

FIG. 2 is a top plan view of the load platform and its pivotal support;

FIG. 3 is a side elevational view of the load platform connected to the elastic member, the electromagnetic means and the eccentric and the differential transformer connected to the eccentric;

FIG. 4 is an end elevational view looking toward the line 4—4 of FIG. 3 in the direction of the arrows;

FIG. 5 is a fragmentary view showing the arrangement of drag links for maintaining the load platform in proper position looking toward the line 5—5 of FIG. 2 in the direction of the arrows;

FIG. 6 is a side view of the drag link looking toward the line 6—6 of FIG. 5 in the direction of the arrows;

FIG. 7 is an end view, on an enlarged scale, of a scissors linkage connecting the electromagnetic means to the pivotal support of the load platform looking from the line 7—7 of FIG. 3 in the direction of the arrows;

FIG. 8 is a cross-sectional view, on an enlarged scale, of the eccentric, cam and follower taken on the line 8—8 of FIG. 4 looking in the direction of the arrows; and FIG. 9 is a cross-sectional view, on an enlarged scale, of two rollers for guiding the elastic member taken on the line 9—9 of FIG. 3 looking in the direction of the arrows.

The embodiment of the invention is illustrated with an endless belt conveyor, the upper or load carrying stretch thereof being partially shown at 10 in FIG. 3 with a portion thereof supported by a load platform comprising a flat plate 11 supported on a frame 12 provided with a center transverse member 13 having the opposite end portions extended beyond the sides of the plate 11 and arranged with depending portions 14. One end of an arm 15 is secured to an intermediate section of each depending portion 14 and the opposite end of said arm 15 is provided with a sleeve 16 secured to each end portion of a tubular shaft 17 having a spindle 18 secured in each end portion of the tubular shaft 17 and extended therefrom to be rotatably supported in bearings 19 mounted on stringers 20 of the supporting structure for the endless belt conveyor. The load platform 11–14 is maintained in proper position or attitude by drag links 21 having the opposite ends pivoted to the lower end of each depending portion 14 and to a bracket 22 mounted on each stringer 20, as shown in FIGS. 5 and 6. The shaft 17 and spindles 18 constitute the main lever, and said shaft 17 and spindles 18 are retained against longitudinal movement by collars 23 secured on the spindles 18, as shown in FIGS. 2 and 4.

The load carrying stretch of the conveyor 10 at both ends of the load platform 11–14 is supported by plates 24' fixedly mounted on the stringers 20, as shown in FIGS. 2 and 3.

The load platform 11–14 and the plates 24' could be formed by troughed idlers mounted on the frame 12–14 and the stringers 20. The load platform 11–14 could also be used for static weighing.

The tare weight of the system and the load on the belt conveyor deflect or rotate the shaft 17 and the spindles 18 causing a bending movement on an elastic member being in the present instance a flat spring 24 having one end clamped to an extended end portion 25 of one of the spindles 18 by a coupling 26 secured to the end portion 25 and having a bifurcation 27 in which the end of the spring 24 is engaged and clamped therein by set screws 28. The opposite end of said spring 24 is extended between two rollers 29 rotatably supported on a head 30 rotatably mounted at 31 on a mounting wall 32 of a cabinet 33 mounted on one of the stringers 20 by brackets 34 and a conveyor support angle 35 by brackets 36, as shown in FIGS. 3, 4 and 9, so that the spring 24 will bend or deflect according to the formula:

$$\sigma = \frac{Ml^2}{2\nu E}$$

M = the bending movement
E = modulus of elasticity
$\nu$ = moment of inertia of the spring
$l$ = length of the spring The advantages of measuring mass instead of weight have been set forth in my Pat. No. 3,354,698.

Since weight or force equals mass times gravitational acceleration, it can be understood that by measuring mass the load platform 11–14, the main lever 17, 18 and the spring 24 are insensitive to any extraneous forces imposed on the system, such as belt tension variations and effects of belt suspension misalignment. These forces will affect only the amplitude of oscillation but not the frequency.

In order to cause the load platform 11–14, the main lever 17, 18 and the spring 24 to oscillate at the natural frequency of the spring 24, the spring 24 has to be excited by short impulses to overcome the frictional losses. These impulses have to be accurately timed with the spring frequency to sustain oscillation.

This is accomplished by electromagnetic means acting on the main lever 17, 18 when the load platform 11–14 is at its maximum downward deflection. The electromagnetic means comprises a solenoid shown diagrammatically at 37 supported on a shelf 38 secured to the mounting wall 32 and the solenoid armature represented by a rod 39 is adjustably connected to a cross-member 40. Since the spring 24 deflects to different positions with changes in load (static deflection) and will oscillate about different positions (dynamic deflection), the opposite ends of the cross-member 40 is connected by links 41 to the ends of a scissors linkage 42 pivotally supported at the cross-center of the middle links by a link 43 from a bracket 44 extended from and fixed to the mounting wall 32. The scissors linkage 42 is connected to an arm 45 extended from the coupling 26. A rod 46 is pivotally connected at one end to the arm 45, as at 47, and the opposite end of the rod 46 is secured to a cross-member 48 connected to the pivotal connections of the middle and upper end links of the scissors linkage 42 through links 49 pivotally connected at their ends to opposite ends of said cross-member 48 and to the pivotal connections of the scissors linkage 42. The scissors linkage 42 is returned to its neutral position when the solenoid 37 is de-energized, by a spring 50 connected to the link 43 and anchored to a screw 51 adjustably mounted in a lateral extension 52 of the bracket 44. The neutral position of the scissors linkage 42 is determined by an adjustable stop in the form of a screw 53 mounted in the lateral extension 52, as shown in FIG. 3. Adjustable stops in the form of screws 54 are mounted in the cross-member 40 to abut the pivotal connections of the middle and lower end links of the scissors linkage 42 so that when the solenoid 37 is energized, the stops 54 abut the scissors linkage when the armature rod 39 moves in a downward direction and exerts a downward force on the links 41 and cause the scissors linkage to act like a rigid beam and transmit a downward vertical force to the arm 45 which will sustain the oscillation of the spring 24. When the arm 45 oscillates, the cross-member 40 is unaffected and is stationary due to the swinging movements of the links 41.

Since the frequency response of the load platform 11–14, the main lever 17, 18 and the spring 24 is not linear with load changes, means are provided to correct the response comprising an eccentric having small eccentricity and consisting of a disc 55 rotatably supported by ball bearing races 56 in a tubular bracket 57 extended inwardly from the mounting wall 32. The disc 55 is eccentrically connected to the arm 45 by a link including a turnbuckle 58 and rods 59 and 60 adjustable in said turnbuckle. The rod 59 is connected to a ring 61 rotatably mounted by a roller bearing race 62 on a stud 63 eccentrically mounted in the disc 55, as shown in FIG. 8. The rod 60 is pivotally connected at 64 to the arm 45. The eccentric will amplify the deflections of the arm 45. A cam 65 encircling the disc 55 and secured thereon is provided with an arcuate slot 66 for the engagement of a pin 67 projected from the tubular bracket 57 to limit the movement of the disc 55 and the cam 65. The contour of the cam 65 is shaped to correct the frequency response by means of a cam follower 68 pivotally mounted on a post 68 extended inwardly from the mounting wall 32 and said cam follower 68 forcedly contacting the cam 65 under the influence of a spring 70 connected at one end to the cam follower and the opposite end of the spring 70 connected to a screw 71 adjustably mounted in a post 72 extended inwardly from the mountig plate 32, as shown in FIG. 8. The contacting force of the cam follower 68 has radial and peripheral components. The radial component does not affect the frequency but the peripheral component does affect σ (deflection of the spring 24) and hence the frequency.

To accurately time the energization of the solenoid 37, a differential transformer, generally indicated at 73, supported on a shelf 74 secured to the mounting wall 32 and having an armature provided with a rod 75 connected by a link 76 to a crank 77 fixed on the stud 63.

According to the formula:

$$f = \frac{1}{2\pi}\sqrt{\frac{g}{\sigma}}$$

$f$ = cycles per second or frequency
$g$ = gravitational acceleration
$\sigma$ = deflection of the spring 24

The frequency is highest at balance of the load platform 11–14 and lowest at full load on said platform. The alternating current output of the differential transformer 73 is amplified and used to trigger a power source for the energization of the solenoid 37, to sustain oscillation of the mass measuring system comprising the load platform 11–14, the main lever 17, 18 and the spring 24. The oscillating system including the electromagnetic means 37, 39 and the differential transformer 73 is self starting. A potentiometer, indicated at 78 in FIG. 1, regulates the power input of the solenoid 37 which depends on the friction losses of the mass measuring system.

Since the frequency varies between a high limit at balance of the load and a low limit at full load, the output pulse frequency of the differential transformer 73 has to be compared over a differential pulse system with the frequency of an oscillator, indicated in a general manner at 79 in FIG. 1, whose frequency is equal to the balance of the mass measuring system.

The differential pulse system output is used to drive a counter or electromagnetic totalizer 80 shown in FIG. 1 which registers the material weight conveyed on the belt conveyor per time unit.

The oscillation frequency has to be adjustable over a limited range for balancing purposes.

This controlling electrical circuit is shown in FIG. 1 wherein the alternating current component of the direct current differential transformer output is preamplified, as indicated at 81, and subsequent to preamplification, the alternating current is passed through a Schmidt trigger 82 which converts the sine wave to a square wave which is polarized by a rectifier and filter 83. The subsequent differential network 84 shapes the pulse for proper triggering by a one shot multivibrator 85 whose output produces pulses of fixed duration and constant amplitude which are amplified by a power amplifier 86 to actuate the solenoid 37 through the potentiometer 78.

A mixer 87 heterodynes the variable frequency from the preamplifier 81 with the preset frequency of the reference oscillator 79. The mixer 87 output is amplified by an intermediate frequency amplifier 88 and the sine wave is converted to a square wave with constant amplitude by a Schmidt trigger 89 whose output is amplified by a relay amplifier 90 and a relay 91, and transmitted to the electromagnetic counter 80. To compensate for changes in the speed or rate of travel of the belt conveyor 10, pulses from a pick-up coil 92 which receives said pulses from a pulser wheel 93 rotated in synchronism with the speed of travel of the belt conveyor 10, are amplified by an amplifier 94 and converted to pulses of fixed duration by a one shot multivibrator 95 having an output relay 96 to allow the pulses coming from the relay amplifier 90 to reach the electromagnetic counter 80 for time intervals proportional to the speed of travel of the belt conveyor 10. When the speed of the belt conveyor is constant, pick-up coil 92, the pulser wheel 93, the amplifier 94, the one shot multivibrator 95, and the output relay 96 are omitted and the relay 91 is connected directly to the electromagnetic counter 80.

Other forms of the differential pulse system could be used without departing from the scope of the present invention.

Having thus described my invention, I claim:

1. A mass measuring system comprising a flat spring having the first end deflected and oscillated by a load and the second end guided and deflected around an axis extending transversely of said spring, the frequency of the oscillation varying inversely porportional to the square root of said load, electromagnetic means connected to the spring to excite and sustain the oscillation of the spring, a transformer actuated by the oscillation of the spring and electrically connected to the electromagnetic means to control the energization of said electromagnetic means, and means electrically connected to the electromagnetic means and the transformer to count the oscillations.

2. A mass measuring system as claimed in claim 1, a load platform supporting the load, a pivot support for said load platform deflected by the load on said platform, and the first end of the flat spring secured to the pivot support.

3. A mass measuring system as claimed in claim 1, wherein the second end of the flat spring is guided and deflected by a pair of rollers engaging opposite faces of said second end of the flat spring and rotatably supported as a unit on an axis extending transversely of the flat spring.

4. A mass measuring system as claimed in claim 2, wherein the electromagnetic means comprises a solenoid having an armature connected to the pivot support.

5. A mass measuring system as claimed in claim 4, wherein the solenoid armature is connected to the pivot support by a scissors linkage to prevent transmission of the deflection and oscillation of the load to the solenoid.

6. A mass measuring system as claimed in claim 2, wherein the transformer is connected to the pivot support.

7. A mass measuring system as claimed in claim 4, wherein the transformer is connected to the pivot support in opposed relation to the connection between the solenoid armature and the pivot support.

8. A mass measuring system as claimed in claim 6, an eccentric interposed in the connection between the transformer and the pivot support to amplify the deflection of the pivot support, and a cam surface arranged on the eccentric and a spring loaded cam follower contacting said cam surface to affect the deflection of the spring and the frequency of the oscillation.

References Cited
UNITED STATES PATENTS

| | | | |
|---|---|---|---|
| 3,059,468 | 10/1962 | Rowe | 73—67.2 |
| 3,354,698 | 11/1967 | Christmann | 73—67.2 |
| 3,443,653 | 5/1969 | Marshall | 177—229 |
| 2,928,668 | 3/1960 | Blasingame | 73—517AV |
| 3,440,888 | 4/1969 | Southworth et al. | 73—517 |

RICHARD C. QUEISSER, Primary Examiner

A. E. KORKOSZ, Assistant Examiner